J. W. STOCKWELL.
Mixing Machines
No. 140,171. Patented June 24, 1873.
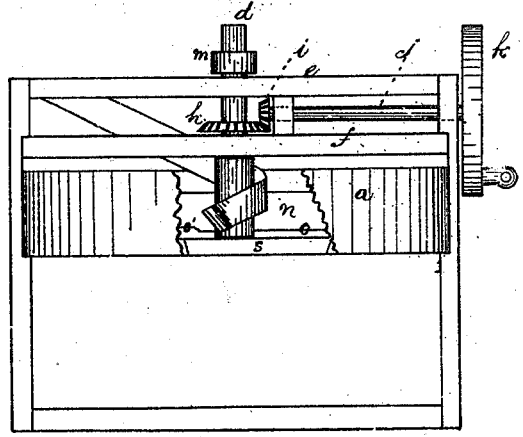
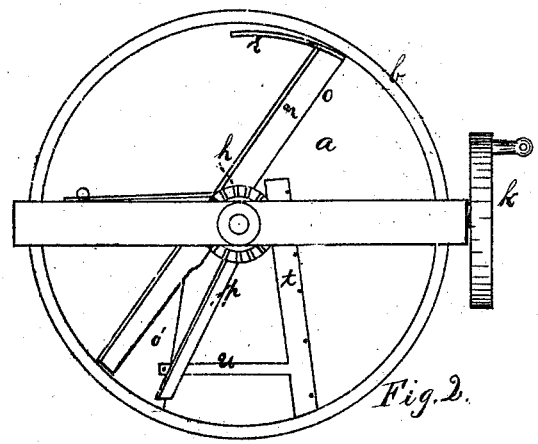
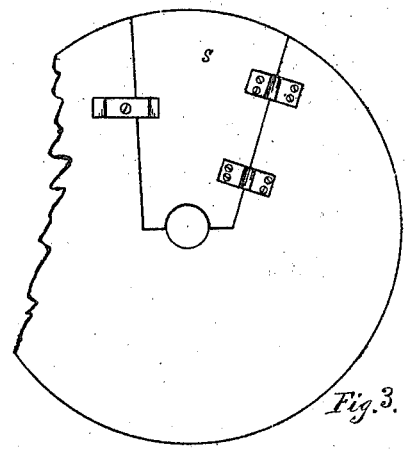
Witnesses:
Frank H. Jordan
Arthur Noble
Inventor:
John W. Stockwell
per Atty
Wm. H. Clifford.

UNITED STATES PATENT OFFICE.

JOHN W. STOCKWELL, OF PORTLAND, MAINE.

IMPROVEMENT IN MIXING-MACHINES.

Specification forming part of Letters Patent No. 140,171, dated June 24, 1873; application filed March 15, 1873.

*To all whom it may concern:*

Be it known, that I, JOHN W. STOCKWELL, of Portland, in the county of Cumberland and State of Maine, have invented certain new and useful Improvements in Mixing-Machines; and I do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1 is a side view in part section; Fig. 2, a top plan; Fig. 3, a bottom view, showing the drop or trap door.

Same letters show like parts.

My invention relates to a machine for the preparation of the compound from which water, drain, and other pipes are now manufactured. This compound is made up of cement and gravel in certain well known proportions, and my machine is designed to mix these ingredients without the use of manual labor. Heretofore this mixing has been done with a hoe, and both involved time and was, at best, apt to be imperfectly done.

My invention consists of a scraper and mixer, $n$. This is placed in an inclined position, as shown, so as to take up the ingredients placed in the circular receptacle. One-half of the scraper and mixer, or the part on one side of the vertical shaft, is so placed as to quite or nearly touch the bottom of the receptacle; the other half, or the part on the other side of this vertical shaft, is so placed as not quite to come in contact with the bottom of the receptacle. The object of this arrangement is that one-half of the mixer and scraper shall press the compound down onto the bottom of the receptacle, and to break up the lumps of the compound and press it down into fineness. The arrangement of the other half is for the purpose of passing under the compound and loosening it, and thus further contributing to the pulverization and thorough intermixing of the substances. $o$ shows the side nearest the bottom of the receptacle; $o^1$ the other. $p$ is a cleaner attached to the machine, in such manner as to rest upon the top edge of the scraper and mixer at right-angles or nearly so to it. It is bent around the upright shaft, so as to admit its revolution and prevent any accumulation of the material around said shaft. The scraper and mixer $n$ rotates with the vertical shaft. The cleaner $p$ remains stationary, and as the mixer and scraper $n$ revolves, it causes the ingredients to pass up over the scraper and mixer and fall off the highest edge, thus further aiding in the process of complete intermingling of all the ingredients.

It will be seen that the cleaner is so attached to the machine as to easily rise and fall as it passes up the inclined plane of the scraper and mixer, and falls down on the other or back side. This cleaner further operates to confine the material, so that it will not be merely pushed around by the scraper and mixer, but will be compelled to pass up and fall over it, as described.

When sheet metal is employed for the mixer and scraper, there is occasioned by its rotary motion a slight vertical vibration, which assists in the mixing.

$r$ is a curved piece on one end of the mixer and scraper, to prevent the massing of the compound up at the side of the receptacle. This the materials would otherwise do, by reason of the operation of centrifugal force. $s$ is the trap or drop hung on hinges to the bottom side of the bottom of the receptacle, so as to open downward, being held up in place by a button on the under side. $t$ is a piece to prevent the material from getting into the joint when the drop is let fall. $u$ is a track to carry the mixer and scraper across the opening of the drop, when it is open. The drop $s$ is to let out the material when mixed.

To discharge the receptacle let fall the trap, and then rotate the mixer and scraper.

The cleaner before described, being placed as shown over the opening of the drop, insures the complete discharge of the material down through the opening. A few rotations of the scraper will clear the receptacle.

In the use of this mixer, the dry materials are first placed in the receptacle, and when they have been thoroughly mixed by it, in a dry state, the liquid is added, and the continued revolutions of the scraper and mixer completes the process ready for packing.

To the vertical shaft other scrapers and mixers may be attached similar to the ones shown. It may be desirable to attach to the described scraper and mixer fingers or blades to aid in the process of mixing. The said fingers or blades may be of any known form calculated to effect the purpose.

The vertical motion or vibration of the mixer and scraper, when the same is not manufactured of sheet metal, can be produced by having the same so arranged as to slip up and down on the vertical shaft.

I do not claim such a combination of plows, knives, and scrapers operating inside of a tub, in combination with a discharge-gate, as set forth in the patent of Putnam & Burt, No. 111,000, of 1871. Neither do I claim a revolving table and scraper, as set out in said patent. Neither do I claim a pug-mill, such as set forth and claimed in the patent of J. C. McKenzie, No. 82,626, of 1868. These two inventions differ from mine in construction, purpose, and operation.

What I claim as my invention, and desire to secure by Letters Patent, is—

1. The scraper and mixer $n$, made as described, and arranged to operate in the receptacle $a$, as herein set forth.

2. The combination of the cleaner $p$ with the scraper and mixer $n$, arranged to operate in the receptacle $a$, as herein set forth.

In testimony that I caim the foregoing I have hereunto set my hand this 12th day of March, 1873.

JOHN W. STOCKWELL.

Witnesses:
JAMES C. JORDAN,
FRANK H. JORDAN.